(12) United States Patent
Klee et al.

(10) Patent No.: US 11,769,913 B2
(45) Date of Patent: Sep. 26, 2023

(54) STORAGE BATTERY DEVICE FOR A BATTERY PACK OF A HANDHELD POWER TOOL

(71) Applicant: Robert Bosch GmbH, Stuttgart (DE)

(72) Inventors: Christoph Klee, Stuttgart (DE); Marcin Rejman, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/118,010

(22) Filed: Dec. 10, 2020

(65) Prior Publication Data

US 2021/0194067 A1 Jun. 24, 2021

(30) Foreign Application Priority Data

Dec. 19, 2019 (DE) .......................... 102019220202.0

(51) Int. Cl.
| | | |
|---|---|---|
| *H01M 50/247* | (2021.01) | |
| *H01M 10/615* | (2014.01) | |
| *H01M 10/6235* | (2014.01) | |
| *H01M 10/48* | (2006.01) | |
| *H01M 50/284* | (2021.01) | |
| *B25F 5/00* | (2006.01) | |
| *H01M 50/244* | (2021.01) | |
| *H01M 10/42* | (2006.01) | |
| *H02J 7/00* | (2006.01) | |

(52) U.S. Cl.
CPC ............ *H01M 10/425* (2013.01); *B25F 5/00* (2013.01); *H01M 10/48* (2013.01); *H01M 10/482* (2013.01); *H01M 10/615* (2015.04); *H01M 10/6235* (2015.04); *H01M 50/244* (2021.01); *H01M 50/247* (2021.01); *H01M 50/284* (2021.01); *H01M 2010/4271* (2013.01); *H01M 2220/30* (2013.01); *H02J 7/0045* (2013.01); *H02J 7/0048* (2020.01)

(58) Field of Classification Search
CPC ........... H01M 10/615; H01M 10/6235; H01M 10/48; H01M 10/42; H01M 10/482; H01M 50/247; H01M 50/244; H01M 50/284
See application file for complete search history.

(56) References Cited

U.S. PATENT DOCUMENTS

| | | | | |
|---|---|---|---|---|
| 5,395,175 | A * | 3/1995 | Bontoux | ............ A45D 26/0014 401/2 |
| 2005/0011026 | A1* | 1/2005 | Hafliger | ............... A61C 17/222 15/22.1 |
| 2014/0349143 | A1* | 11/2014 | Ogura | ............... H01M 10/4257 429/7 |

(Continued)

FOREIGN PATENT DOCUMENTS

| | | |
|---|---|---|
| DE | 202014009989 U1 | 1/2015 |
| DE | 202017105258 A1 | 9/2017 |

(Continued)

*Primary Examiner* — Karie O'Neill Apicella
(74) *Attorney, Agent, or Firm* — NORTON ROSE FULBRIGHT US LLP; Gerard Messina

(57) ABSTRACT

A storage battery device for a battery pack of a handheld power tool. The storage battery device including at least one electronics unit that has at least one circuit board. The electronics unit includes at least one electrically conductive plastic element, in particular, an electrically conductive elastomer, which is connected electrically to at least the circuit board.

13 Claims, 6 Drawing Sheets

(56) References Cited

U.S. PATENT DOCUMENTS

2015/0180098 A1* 6/2015 Eckl .................... H01M 50/249
                                                              429/120
2017/0144291 A1 5/2017 Tsutsui et al.

FOREIGN PATENT DOCUMENTS

| | | |
|---|---|---|
| DE | 102016225730 A1 | 6/2018 |
| DE | 102018210663 A1 | 1/2020 |
| DE | 202019104365 A1 | 1/2020 |
| WO | 2004096500 A1 | 11/2004 |

* cited by examiner

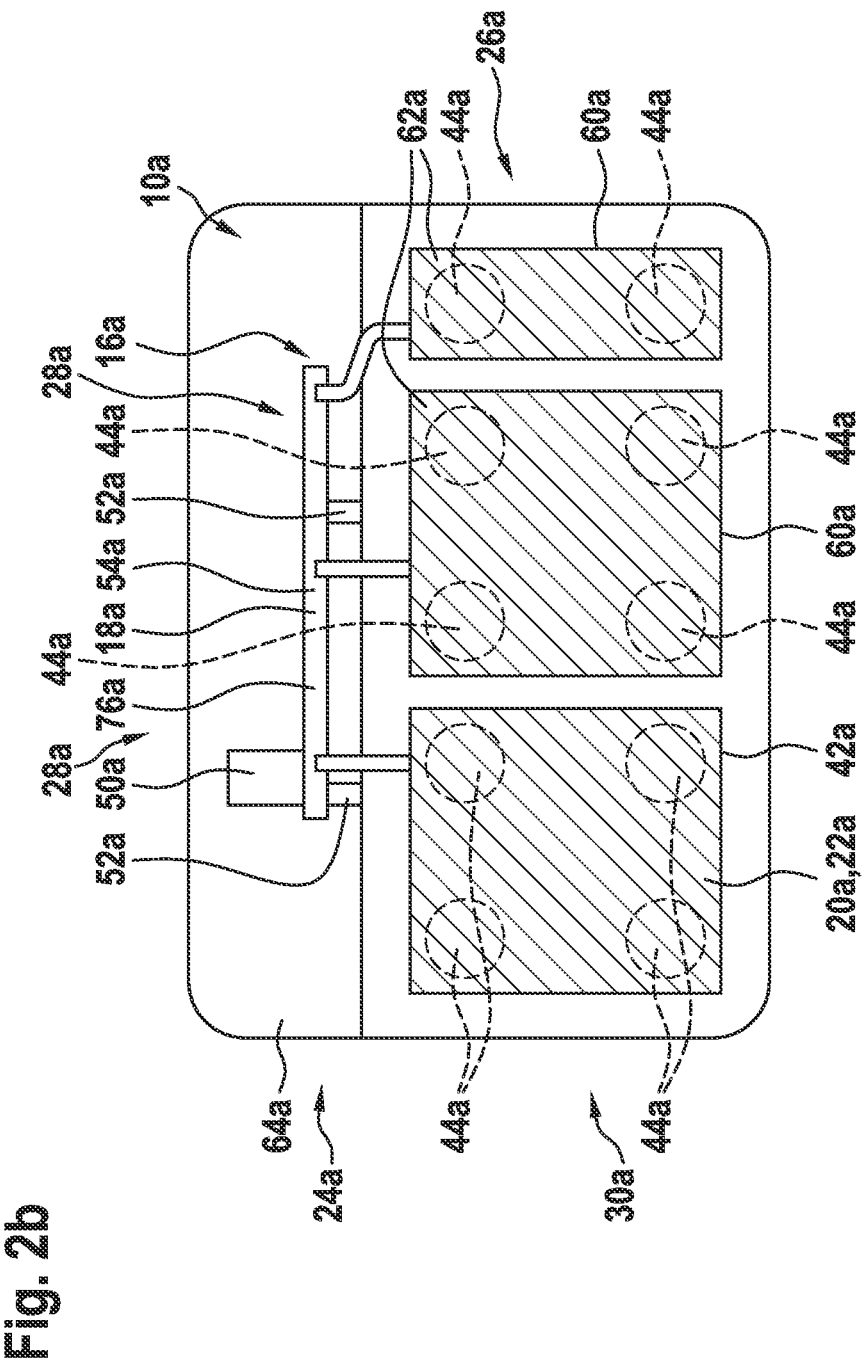

STORAGE BATTERY DEVICE FOR A BATTERY PACK OF A HANDHELD POWER TOOL

CROSS REFERENCE

The present application claims the benefit under 35 U.S.C. § 119 of German Patent Application No. DE 102019220202.0 filed on Dec. 19, 2019, which is expressly incorporated herein by reference in its entirety.

BACKGROUND INFORMATION

A convention storage battery device for a battery pack of a handheld power tool includes at least one electronics unit that has at least one circuit board.

SUMMARY

The present invention relates to a storage battery device for a battery pack of a handheld power tool, including at least one electronics unit, which has at least one circuit board.

In accordance with an example embodiment of the present invention, the electronics unit includes at least one electrically conductive plastic element, in particular, an electrically conductive elastomer, which is connected electrically to at least the circuit board. This advantageously allows a high degree of protection of a storage battery device to be achieved. A high degree of functionality of an electronics unit may be provided in an advantageous manner. A simple type of construction of a storage battery device may be implemented in an advantageous manner. Particularly simple electrical contacting of a circuit board may advantageously be produced. A high degree of reliability of the electrical contacting of an electronics unit may be ensured in an advantageous manner.

In particular, the electrically conductive plastic element is made completely of a conductive plastic. The electrically conductive plastic element is preferably made of an electrically conductive polymer, such as a polypropylene (PP), a polyethylene (PE), a polyester, a polymer mixture (mixture of a homopolymer and a copolymer), or another polymer appearing useful to one skilled in the art. In particular, the electrically conductive plastic element takes the form of an electrically conductive elastomer. In particular, it is possible for the electrically conductive plastic element to be doped. It is also possible for the electrically conductive plastic element to be made of an extrinsically conductive polymer, which is preferably conductive due to electrically conductive fillers, such as aluminum flakes, carbon or the like. In particular, it is possible for the electronics unit to include a plurality of electrically conductive plastic elements. In particular, the electrically conductive plastic element is at least partially, preferably completely, wire-shaped. However, it is also possible for the electrically conductive plastic element to be at least partially planar. It is also possible for the electrically conductive plastic element to be completely planar.

The electrically conductive plastic element is preferably designed to electrically connect at least the circuit board to at least a further unit and/or a further element of the storage battery device. In particular, the electrically conductive plastic element is configured to electrically connect at least the circuit board to a battery cell unit of the storage battery device. The battery cell unit preferably includes at least one cell holder unit. In particular, the cell holder unit has at least one battery cell, in particular, a plurality of battery cells; the cell holder unit being designed at least to hold the battery cells. The battery cells of the cell holder unit are preferably interconnected electrically by at least one cell connector and/or a further cell connector. The cell connector is preferably positioned at negative poles of the battery cells, in particular, connected to the negative poles of the battery cells electrically. The further cell connector is preferably positioned at positive poles of the battery cells, in particular, connected to the positive poles of the battery cells electrically. In particular, the at least one battery cell takes the form of a lithium ion cell. It is also possible for the battery cell to take the form of a different conventional battery cell, such as a Pb battery cell, a NiCd battery cell, a NiFe battery cell, or the like. The electrically conductive plastic element is preferably connected to the negative poles of the battery cells electrically, in particular, via the cell connector. It is also possible for the electrically conductive plastic element to be connected electrically to the positive poles of the battery cells, in particular, via the further cell connector.

In particular, metallic, electrical contact elements of the battery device, such as ones containing copper or made out of copper, which are intended for electrical contacting, and/or contacting enabling data exchange, of the battery device, with mating contact elements of the handheld power tool and/or with mating contact elements of a battery charger, are preferably provided on the circuit board. In particular, the circuit board is situated on, in particular, for the most part, in, a housing unit of the battery device and/or on the battery cell unit.

Using at least one spacing element, preferably, a plurality of spacing elements, the circuit board is preferably positioned on the battery cell unit so as to be set apart from it. It is also possible for the circuit board to be positioned directly on the battery cell unit. In particular, at least the electrical contact element is situated on a side of the circuit board, which is opposite to a further side, on which at least the spacing element is situated. In particular, the battery cell unit is at least partially connected to the electrical contact elements of the circuit board electrically, via at least the electrically conductive plastic element. In particular, the circuit board includes at least one electrical contact surface, on which the electrically conductive plastic element is situated. In particular, the contact surface is positioned so as to be set apart from the electrical contact elements. In particular, the electrically conductive plastic element is pressed against the contact surface. It is also possible for the electrically conductive plastic element to be glued, bolted, clamped, or the like, to the contact surface.

In particular, the electronics unit includes at least one further electrically conductive plastic element, preferably, a plurality of further electrically conductive plastic elements. In particular, the further electrically conductive plastic element is formed identically to the electrically conductive plastic element. It is also possible for the further electrically conductive plastic element to be formed differently from the electrically conductive plastic element. In particular, the further electrically conductive plastic element is connected electrically to the positive poles of the battery cells, in particular, via the further cell connector. It is also possible for the further electrically conductive plastic element to be connected to the negative poles of the battery cells electrically, in particular, via the cell connector. In particular, the further electrically conductive plastic element is situated on a further electrical contact surface of the circuit board. In particular, the further electrical contact surface is positioned so as to be set apart from the electrical contact elements. In particular, the further electrical contact surface is positioned oppositely to the electrical contact surface. In particular, the further electrically conductive plastic element is pressed against the further electrical contact surface. It is also possible for the further electrically conductive plastic element to be glued, bolted, clamped, or the like, to the further contact surface.

In particular, it is possible for the battery cell unit to include a further cell holder unit. In particular, the further cell holder unit is formed identically to the cell holder unit. It is also possible for the further cell holder unit to be formed differently from the cell holder unit. It is possible for the further cell holder unit to have a number of battery cells different from that of the cell holder unit. It is also possible for the further cell holder unit to include battery cells, which are formed differently from the battery cells of the cell holder unit. In particular, the electronics unit includes at least one additional electrically conductive plastic element, preferably, a plurality of additional electrically conductive plastic elements, and at least another additional electrically conductive plastic element, preferably, a plurality of other additional electrically conductive plastic elements. In particular, at least the additional electrically conductive plastic element is formed at least identically to the electrically conductive plastic element. It is also possible for at least the additional electrically conductive plastic element and/or at least the other additional electrically conductive plastic element to be formed differently from the electrically conductive plastic element. Preferably, all of the electrically conductive plastic elements are formed identically, in particular, with regard to their electrical characteristics. In particular, the further cell holder unit is connected to the circuit board via the additional electrically conductive plastic element and/or the other additional electrically conductive plastic element. In particular, the further cell holder unit is positioned so as to be set apart from the cell holder unit. In particular, at least the electrically conductive plastic element and the further electrically conductive plastic element are positioned so as to be set apart from the additional electrically conductive plastic element and the other additional electrically conductive plastic element.

In particular, it is possible for the electronics unit to include at least one further circuit board. In particular, the further circuit board is formed at least substantially identically to the circuit board. "At least substantially identical" is to be understood as, in particular, identical right down to a reflection, preferably, a point reflection, particularly preferably, right down to an axial reflection. However, it is also possible for the further circuit board to be formed differently from the circuit board. In particular, the further circuit board is intended for a function different from the function of the circuit board, such as, in particular, indicating a state of charge. In particular, at least the electrically conductive plastic element is designed to electrically connect at least the circuit board to the further circuit board. It is also possible for the further circuit board to be connected electrically, in particular, electrically in a direct manner, to the battery cell unit, preferably, at least via the electrically conductive plastic element. In particular, the further circuit board is positioned so as to be set apart from the circuit board. In particular, the further circuit board is situated on the battery cell unit. In particular, the further circuit board is situated on the battery cell unit so as to be set apart from it by spacing elements. It is also possible for the further circuit board to be positioned directly on the battery cell unit.

In addition, in accordance with an example embodiment of the present invention, it is provided that the electrically conductive plastic element have at least an electrical conductivity in a range of $10^{-10}$ S cm$^{-1}$ to $10^3$ S cm$^{-1}$. A low volume resistivity of an electrically conductive plastic element may be produced in an advantageous manner. In particular, at least the electrically conductive plastic element is configured to transmit electrical power. At least the electrically conductive plastic element is preferably configured to transmit an electrical signal. It is possible for at least the electrically conductive plastic element to be at least configured to form at least part of an electrical heating unit. It is also possible for the electrically conductive plastic element to have an electrical conductivity, which lies in a range different from the range of $10^{-10}$ S cm$^{-1}$ to $10^3$ S cm$^{-1}$, in particular, below the range of $10^{-10}$ S cm$^{-1}$ to $10^3$ S cm$^{-1}$, or, advantageously, above the range of $10^{-10}$ S cm$^{-1}$ to $10^3$ S cm$^{-1}$. In particular, the further electrically conductive plastic element, the additional electrically conductive plastic element, and/or the other additional electrically conductive plastic element has an electrical conductivity identical to the electrical conductivity of the electrically conductive plastic element. It is also possible for the further electrically conductive plastic element, the additional electrically conductive plastic element, and/or the other additional electrically conductive plastic element to have an electrical conductivity different from, in particular, less than or greater than, the electrical conductivity of the electrically conductive plastic element. The electrically conductive plastic element preferably has a maximum electrical volume resistance, which is, in particular, less than $10^9$ Ohm, preferably, less than $10^7$ Ohm, and, particularly preferably, less than $10^5$ Ohm.

It is further provided that the battery device include at least one housing unit, in particular, the one already mentioned above, and a battery cell unit, in particular, the one already mentioned above; the electrically conductive plastic element being situated on the battery cell unit and/or on the housing unit. A high level of protection of the battery cell unit is advantageously ensured. An electronics unit having a high level of functionality may be advantageously produced for the battery cell unit. In particular, the electrically conductive plastic element is positioned at least substantially completely, preferably completely, between the housing unit and the battery cell unit. "At least substantially completely" is to be understood as, in particular, at least 50%, preferably, at least 75%, and, particularly preferably, at least 90%, of a total volume and/or a total mass of an object, in particular, of the electrically conductive plastic element. In particular, the electrically conductive plastic element surrounds the battery cell unit at least partially. In particular, the housing unit includes at least one lateral cover. The lateral cover is situated on the battery cell unit, preferably, on the cell holder unit. In particular, the battery cell unit is surrounded at least partially by the lateral cover. In particular, the electrically conductive plastic element is situated between the lateral cover and the battery cell unit. Preferably, the electrically conductive plastic element is surrounded at least partially, in particular, at least substantially completely, and, particularly preferably, completely, by the lateral cover. The lateral cover preferably forms at least one shoulder, which faces the circuit board. In particular, the shoulder has a free end, which is opposite to the electrical contact surface of the circuit board. In particular, the free end of the shoulder of the lateral cover is positioned so as to be set apart from the electrical contact surface of the circuit board. The electrically conductive plastic element is preferably positioned at least partially between the lateral cover, in particular, the free end of the shoulder of the lateral cover, and the circuit board, preferably, the electrical contact surface of the circuit board. In particular, the electrically conductive plastic element may be forced against the circuit board by the lateral cover. It is also possible for contacting, in particular, electrical contacting, of at least the electrically conductive plastic element with the circuit board to be able to be produced with the aid of a spring unit. Preferably, the spring unit is formed in one piece with the electrically conductive plastic element, is attached to the circuit board, or is formed in one piece with the circuit board. In addition, it is possible for at least the electrically conductive plastic element to be pressed into the circuit board with the aid of a pressing technique. In particular, the electrically conductive plastic element may be forced by the lateral cover against the cell holder unit, preferably, against the cell connector of the battery cells. It is also possible for the electrically conductive plastic element to be able to be fastened to the cell connector by at least one fastening element, such as a screw, preferably, a retaining ring. In order to attach the electrically conductive plastic element, the cell connector preferably includes a recess, which has, in particular, toothing pointing inwards; the toothing being configured to secure the electrically conductive plastic element, which is insertable at least partially into the recess, to the cell connector, in particular, in the manner of a barb. In particular, the electrically conductive plastic element is guided at least partially through the lateral cover and/or the battery cell unit.

In particular, the further electrically conductive plastic element is positioned at least substantially completely, preferably completely, between the housing unit and the battery cell unit. In particular, the further electrically conductive plastic element surrounds the battery cell unit at least partially. In particular, the housing unit includes at least one further lateral cover. In particular, the further lateral cover is situated on the battery cell unit, preferably, on the cell holder unit. In particular, the battery cell unit is surrounded at least partially by the further lateral cover. In particular, the further electrically conductive plastic element is situated between the further lateral cover and the battery cell unit. In particular, the further electrically conductive plastic element is surrounded by the further lateral cover at least partially, preferably, at least substantially completely, and particularly preferably, completely. In particular, the further lateral cover is formed at least substantially identically to the lateral cover. It is also possible for the further lateral cover to be formed differently from the lateral cover. In particular, a free end of a shoulder of the further lateral cover faces the circuit board. The free end of the shoulder of the further lateral cover is preferably opposite to the further electrical contact surface of the circuit board; the free end of the shoulder of the further lateral cover being positioned, in particular, so as to be set apart from the further electrical contact surface. In particular, the further electrically conductive plastic element is positioned at least partially between the further lateral cover, in particular, the free end of the shoulder of the further lateral cover, and the circuit board, preferably, the further electrical contact surface of the circuit board. In particular, the further electrically conductive plastic element may be forced against the circuit board by the further lateral cover. In particular, the further electrically conductive plastic element may be forced by the further lateral cover against the cell holder unit, preferably, against the further cell connector. In particular, the further electrically conductive plastic element is guided at least partially through the further lateral cover and/or the battery cell unit.

It is further provided that the storage battery device include at least one housing unit, in particular, the one already mentioned above, and a battery cell unit, in particular, the one already mentioned above; the electrically conductive plastic element being molded into the battery cell unit and/or into the housing unit. A particularly simple type of construction of a storage battery device with regard to at least the manufacturing costs may be implemented in an advantageous manner. Particularly simple contacting of the circuit board with the battery cell unit may advantageously be produced. A particularly high degree of reliability of electrical contacting of the circuit board may be achieved in an advantageous manner. In particular, at least the electrically conductive plastic element is extruded onto the cell holder unit, onto the cell connector, and/or onto the lateral cover. In particular, it is possible for the electrically conductive plastic element to be formed in one piece with the lateral cover. "In one piece" is to be understood as, in particular, at least integrally joined, for example, by a welding method, an adhesive bonding method, an injection molding method, and/or another method appearing to be useful to one skilled in the art; and/or understood as formed advantageously in one piece, such as through production from casting and/or through production in a single-component or multicomponent injection molding method, and, advantageously, from a single blank. In particular, the circuit board includes an additional electrical contact surface. In particular, the additional electrical contact surface of the circuit board is positioned oppositely to the battery cell unit. In particular, the electrically conductive plastic element is situated on the additional electrical contact surface, preferably, connected to the additional electrical contact surface electrically. In particular, the further electrically conductive plastic element is extruded onto the cell holder unit, onto the further cell connector, and/or onto the further lateral cover. In particular, it is possible for the further electrically conductive plastic element to be formed in one piece with the further lateral cover. In particular, the further electrically conductive plastic element is situated on the additional electrical contact surface, preferably, connected to the additional electrical contact surface electrically.

It is further provided that the storage battery device include at least one battery cell unit, in particular, the one already mentioned above, and at least one monitoring unit, which is configured to at least monitor the battery cell unit; the monitoring unit being formed at least partially by the electrically conductive plastic element. A high degree of protection of a storage battery device may be provided in an advantageous manner. A simple type of construction of a monitoring unit for a storage battery device may be provided in an advantageous manner. In particular, the monitoring unit is at least configured to monitor the voltages of the individual battery cells. In particular, the monitoring unit includes a regulating and/or control unit. In particular, the regulating and/or control unit is situated on the circuit board. In particular, the regulating and/or control unit is at least configured to measure the voltages of the battery cells, which are connected electrically to the regulating and/or control unit, in particular, via at least the electrically conductive plastic element, the further electrically conductive plastic element, the additional electrically conductive plastic elements, and/or the other additional electrically conductive plastic elements, in particular, with the aid of the circuit board.

In addition, it is provided that the storage battery device include at least one battery cell unit, in particular, the one already mentioned above, and at least one electrical circuit protection unit, which is configured to protect at least the battery cell unit and/or the electronics unit at least from damage due to a short circuit; the electrical circuit protection unit being formed at least partially by the electrically conductive plastic element. A high level of protection of a storage battery device from heat damage, in particular, heat damage able to be caused by high currents, may be provided in an advantageous manner. In particular, the electrical circuit protection unit is formed by the electrically conductive plastic element and/or the further electrically conductive plastic element. In particular, the electrically conductive plastic element and/or the further electrically conductive plastic element is/are designed to warm up at least in the event of a short circuit.

In accordance with an example embodiment of the present invention, it is further provided that the storage battery device include at least one battery cell unit, in particular, the one already mentioned above, and at least one heating unit, in particular, the one already mentioned above, which is intended at least for heating the battery cell unit; the heating unit being formed at least partially by the electrically conductive plastic element. A high degree of functionality of an electrically conductive plastic element may be advantageously achieved. A high degree of protection of a storage battery device from low-temperature damage may be achieved in an advantageous manner. In particular, the heating unit is formed by at least the electrically conductive plastic element, the further electrically conductive plastic element, and at least the additional electrically conductive plastic element, preferably, a plurality of additional electrically conductive plastic elements. In particular, the electrically conductive plastic element is connected electrically to the further electrically conductive plastic element. In particular, the electrically conductive plastic element and the further electrically conductive plastic element are connected electrically via at least the additional electrically conductive plastic element. In particular, between the electrically conductive plastic element and the further electrically conductive plastic element, a voltage may be applied, which is intended to generate a flow of current through at least the electrically conductive plastic element, the further electrically conductive plastic element, and the additional electrically conductive plastic element. In particular, at least warming of the electrically conductive plastic element, the further electrically conductive plastic element, and/or the additional electrically conductive plastic element may be generated by the flow of current through the electrically conductive plastic element, the further electrically conductive plastic element, and the additional electrically conductive plastic element, which means that, in particular, warming of the battery cell unit may be generated, as well. In particular, the monitoring unit includes at least one sensor unit. The sensor unit has, in particular, at least one temperature sensor. In particular, the regulating and/or control unit is at least configured to apply at least one voltage at least between the electrically conductive plastic element and the further electrically conductive plastic element, preferably, as a function of a parameter, in particular, a temperature parameter, such as a battery cell temperature, an ambient temperature, or the like. In particular, the temperature parameter is measurable at least by the temperature sensor. In particular, the electrically conductive plastic element and the further electrically conductive plastic element each have a cross-sectional diameter, which is preferably greater than a cross-sectional diameter of the additional electrically conductive plastic element. It is also possible for the cross-sectional diameter of the electrically conductive plastic element, the cross-sectional diameter of the further electrically conductive plastic element, and the cross-sectional diameter of the additional electrically conductive plastic element to be at least substantially identical, preferably, identical, to each other.

In addition, it is provided that the electronics unit include at least one operating element, in particular, a pushbutton element, which is formed at least partially by the electrically conductive plastic element. An electronics unit, which allows a particularly simple type of construction of an operating element, may be provided in an advantageous manner. In particular, the operating element is positioned at least partially on the housing unit. In particular, the operating element is movably supported at least partially on the housing unit. In particular, the operating element is formed at least by a pushbutton, the electrically conductive plastic element, and the further electrically conductive plastic element; the electrically conductive plastic element and/or the further electrically conductive plastic element preferably being made of an electrically conductive elastomer. The electrically conductive plastic element and the further electrically conductive plastic element are preferably positioned at least partially between the pushbutton and the battery cell unit, which are positioned so as to be set apart from each other, in particular, in a rest state. In particular, the electrically conductive plastic element and/or the further electrically conductive plastic element is/are designed to deform under a force applied to the pushbutton; the force pointing, in particular, in a direction facing the battery cell unit. In particular, the electrically conductive plastic element and/or the further electrically conductive plastic element is/are configured to deform, in such a manner, due to the force applied to the pushbutton during manipulation of the operating element, that the electrically conductive plastic element contacts the further electrically conductive plastic element directly.

It is further proposed that the storage battery device include at least one battery cell unit, in particular, the one already mentioned above, and at least one evaluation unit, which is configured to evaluate a code of the battery cell unit; the code being formed at least partially by the electrically conductive plastic element. A code of a battery cell unit may be advantageously produced in a particularly simple manner. A "code" is to be understood, in particular, as a parameter, preferably, an identification parameter, such as a type of storage battery or the like. In particular, it is possible for the code to be a function of, for example, at least a number of cell holder units, a number of battery cells, a voltage of the battery cells, a configuration of the battery cells, and/or the like. In particular, the evaluation unit is situated on the circuit board. In particular, it is possible for the evaluation unit to be formed in one piece with the circuit board. In particular, the circuit board has at least one contact point, preferably, at least a plurality of contact points. In particular, the contact points are connected electrically to the evaluation unit by electrical conductors, such as a wire, a circuit trace, or the like. In particular, a coding element of the code, which may be read out, in particular, by the evaluation unit, may be generated by an electrical connection of particular contact points via at least the electrically conductive plastic element. In particular, it is possible that at least with the aid of the further electrically conductive plastic element, at least a further coding element of the code of the battery cell unit is formed at least partially by an electrical connection of particular contact points, which are, in particular, different from the contact points that are connected electrically via the electrically conductive plastic element In particular, it is possible that along a major axis of extension of the electrically conductive plastic element, the further electrically conductive plastic element has a maximum length, which is, in particular, different from a maximum length of the further electrically conductive plastic element along a major axis of extension of the further electrically conductive plastic element. In this context, a "major axis of extension" of an object is to be understood, in particular, as an axis, which runs parallelly to the longest edge of the smallest geometric, right parallelepiped, which only just encloses the object completely. It is also possible for the maximum length of the electrically conductive plastic element along the major axis of extension to correspond to the maximum length of the further electrically conductive plastic element along the major axis of extension. In particular, it is possible for the evaluation unit to include at least one reference element, which is formed, in particular, at least by two further contact points of the circuit board and the additional electrically conductive plastic element. In particular, the reference element is situated on the circuit board. In particular, the reference element is electrically connected to the evaluation unit by at least one electrical conductor, preferably, two electrical conductors. In particular, the reference element is formed independently of the code of the battery cell unit. In particular, the evaluation unit is configured to measure a resistance value of the reference element and to compare it to the code.

Furthermore, a battery pack including a storage battery device of the present invention is provided in accordance with an example embodiment of the present invention. A high degree of protection of a battery pack may be ensured in an advantageous manner. A simple type of construction of a battery pack having a high degree of functionality may be advantageously provided. In particular, the battery pack has a battery pack housing. The battery pack housing is preferably formed in one piece with the housing unit of the storage battery device. However, it is also possible for the battery pack housing to be formed separately from the housing unit and to surround the housing unit of the storage battery device at least for the most part and/or to contain the housing unit of the storage battery device. The battery pack is preferably equipped for use with a handheld power tool. However, it is also possible for the battery pack to be configured for other devices appearing practical to one skilled in the art, such as portable communications devices, portable home electronics, or the like.

In addition, a handheld power tool having an, in particular, exchangeable battery pack of the present invention is provided. A high degree of readiness for operation of a handheld power tool may be achieved in an advantageous manner. In particular, it is possible for the handheld power tool to include a battery pack holding fixture, which is designed to secure the battery pack detachably. The handheld power tool may take the form of a chipping hammer, hammer drill, drill, cordless screwdriver, sander, milling machine, garden machine, or other handheld power tool appearing useful to one skilled in the art. In particular, the handheld power tool includes a housing. In particular, it is possible for the battery pack to be situated at least substantially completely, preferably, completely, inside the housing of the handheld power tool. In particular, at least the electrically conductive plastic element, the further electrically conductive plastic element, and/or the additional electrically conductive plastic element is/are situated outside of the housing. It is also possible for at least the electrically conductive plastic element, the further electrically conductive plastic element, and/or the additional electrically conductive plastic element to be situated inside the housing. It is also possible for at least the electrically conductive plastic element, the further electrically conductive plastic element, and/or the additional electrically conductive plastic element to be surrounded by the housing at least substantially completely, particularly preferably, completely.

In addition, a method for manufacturing a storage battery device, in particular, of the present invention, for a battery pack of a handheld power tool, is provided; in at least one method step, at least one electrically conductive plastic element, in particular, the electrically conductive plastic element already mentioned above, of an electronics unit, in particular, the one already mentioned previously, of the storage battery device, being manufactured at least partially in a dispensing method or a 3-D printing method. Particularly simple manufacturing of an electrically conductive plastic element of an electronics unit may be implemented in an advantageous manner. In particular, in at least one method step, a molded element of at least the electrically conductive plastic element is manufactured in a single-component injection molding method. In particular, in at least one further method step, an electrically conductive material, in particular, e.g., an electrically conductive sealing compound, an electrically conductive adhesive agent, or the like, is dispensed onto the molded element of the electrically conductive plastic element. It is also possible that in at least one further method step, the electrically conductive material is deposited onto the molded element in a 3-D printing method. It is also possible that in at least one method step, the electrically conductive plastic element is manufactured completely in a 3-D printing method. It is also possible that in at least one method step, at least the electrically conductive plastic element is manufactured in a two-component injection molding method.

In this connection, the storage battery device of the present invention, the battery pack of the present invention, the handheld power tool of the present invention, and/or the method of the present invention shall not be limited to the use and specific embodiment described above. In particular, in order to achieve a functionality described here, the storage battery device of the present invention, the battery pack of the present invention, the handheld power tool of the present invention, and/or the method of the present invention may have a number of individual elements, component parts and units, as well as method steps, different from a number mentioned here. In addition, in the ranges of values indicated in this description, values lying within the above-mentioned limits are also to be acknowledged as described and as applicable as desired.

BRIEF DESCRIPTION OF THE DRAWINGS

Further advantages of the present invention are derived from the description of the figures that follows. Five exemplary embodiments of the present invention are represented in the figures. The figures and the description include numerous features in combination. One skilled in the art will necessarily consider the features individually, as well, and unite them to form useful, further combinations.

FIG. 2b shows a side view of a schematic representation of the first variant of the storage battery device according to an example embodiment of the present invention.

DETAILED DESCRIPTION OF EXAMPLE EMBODIMENTS

Figure 1:
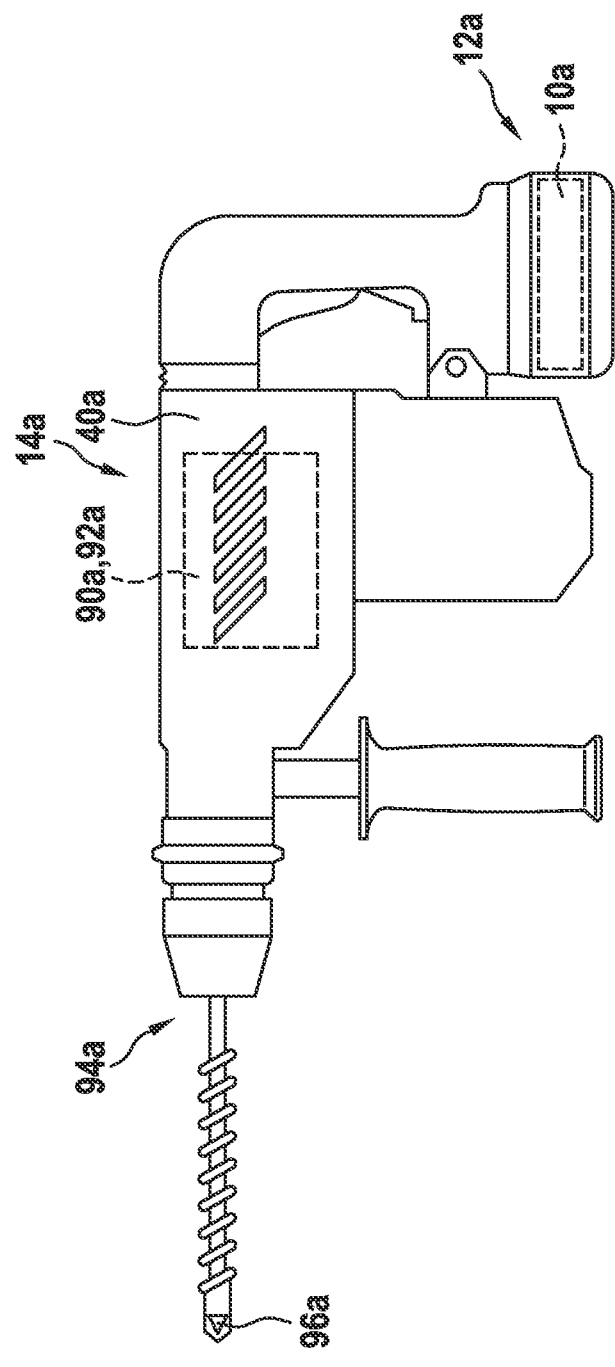
FIG. 1 shows a schematic representation of a handheld power tool of the present invention, including a battery pack of the present invention and a storage battery device of in accordance with an example embodiment of the present invention.

FIG. 1 shows a handheld power tool 14a having an, in particular, exchangeable battery pack 12a; handheld power tool 14a taking the form of a battery-operated hammer drill. Battery pack 12a is configured to supply an electrical load circuit 90a, in particular, an electric motor 92a, at least with electrical power. Handheld power tool 14a includes a housing 40a. Electrical load circuit 90a is provided for propelling a tool holding fixture 94a, in particular, in a rotary manner; a tool 96a being able to be secured in tool holding fixture 94a. Battery pack 12a is detachably mounted to housing 40a and includes a storage battery device 10a.

Figure 2A:
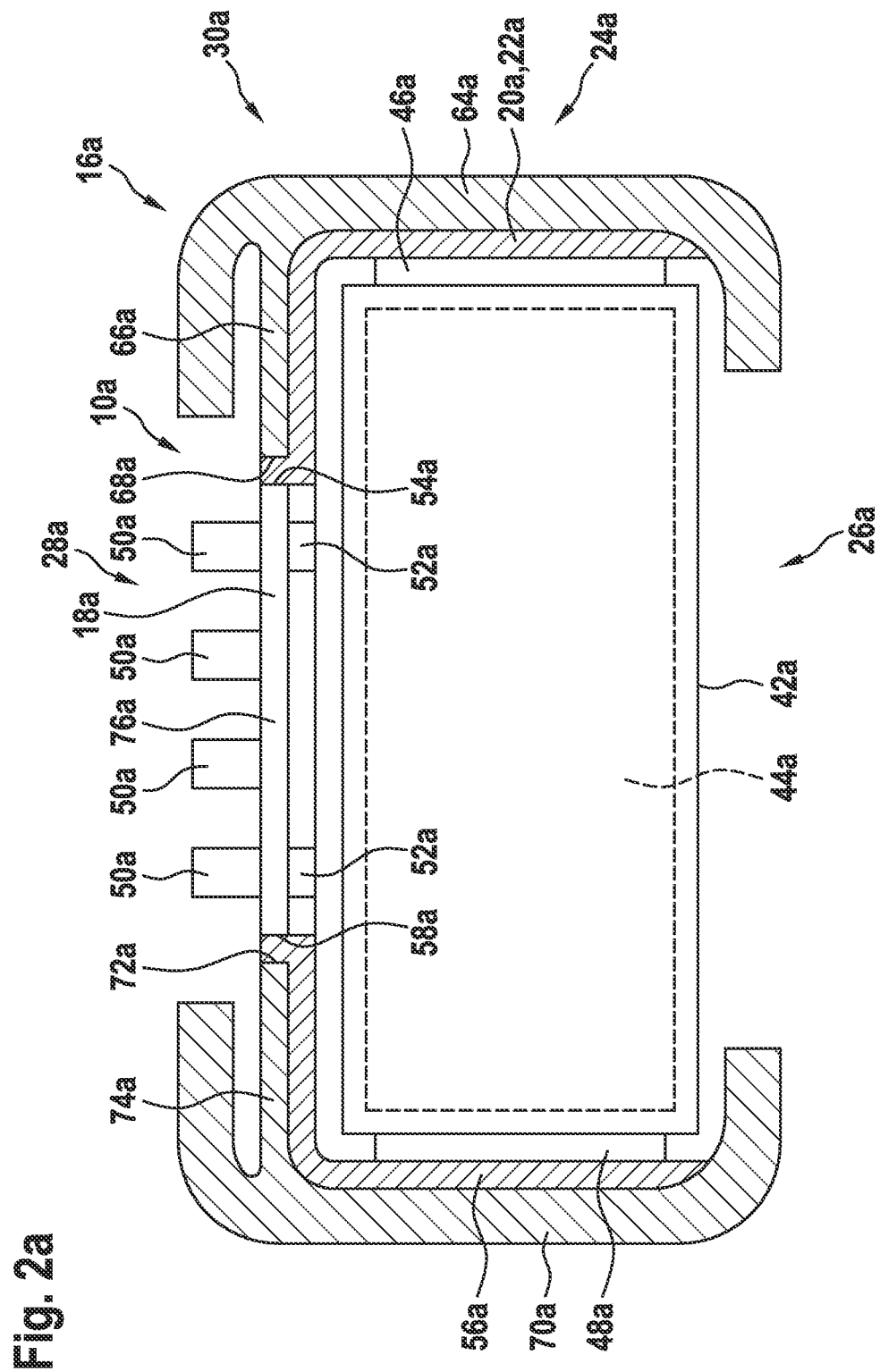
FIG. 2a shows a front view of a schematic representation of a first variant of the storage battery device according to an example embodiment of the present invention.

FIG. 2a and FIG. 2b show a front view (FIG. 2a) and a side view (FIG. 2b) of a first variant of storage battery device 10a; storage battery device 10a including at least one electronics unit 16a, which has at least one circuit board 18a. Electronics unit 16a includes at least one electrically conductive plastic element 20a, in particular, an electrically conductive elastomer 22a, which is electrically connected to at least circuit board 18a. Electrically conductive plastic element 20a is made completely of a conductive plastic. Electrically conductive plastic element 20a is partially wire-shaped and partially planar. Electrically conductive plastic element 20a is configured to electrically connect at least circuit board 18a to at least a further unit and/or one further element of storage battery device 10a. Electrically conductive plastic element 20a is configured to electrically connect at least circuit board 18a to a battery cell unit 26a of storage battery device 10a. Battery cell unit 26a includes at least one cell holder unit 42a, which has a plurality of battery cells 44a. Cell holder unit 42a is configured to hold battery cells 44a. Battery cells 44a of cell holder unit 42a are interconnected electrically by a cell connector 46a and a further cell connector 48a. Cell connector 46a is positioned at negative poles of battery cells 44a and connected to the negative poles electrically. Further cell connector 48a is positioned at positive poles of battery cells 44a and connected to the positive poles electrically. Battery cells 44a take the form of lithium ion cells. Electrically conductive plastic element 20a is connected electrically to the negative poles of battery cells 44a via cell connector 46a. Electrical contact elements 50a, which are intended for electrical contacting, and/or contacting enabling data exchange, of battery device 10a to mating contact elements of handheld power tool 14a and/or to mating contact elements of a battery charger, are situated on circuit board 18a. Circuit board 18a is situated on battery cell unit 26a of storage battery device 10a. Circuit board 18a is positioned at battery cell unit 26a so as to be set apart from it by spacing elements 52a. Contact elements 50a are situated on a side of circuit board 18a, which is opposite to a further side of circuit board 18a, on which spacing elements 52a are situated. Battery cell unit 26a is at least partially connected to electrical contact elements 50a of circuit board 18a electrically, via at least electrically conductive plastic element 20a. Circuit board 18a includes at least one electrical contact surface 54a, at which electrically conductive plastic element 20a is situated. Electrical contact surface 54a is positioned so as to be set apart from electrical contact elements 50a. Electrically conductive plastic element 20a is pressed against electrical contact surface 54a.

Electronics unit 16a includes at least one further electrically conductive plastic element 56a, which is formed identically to electrically conductive plastic element 20a. Further electrically conductive plastic element 56a is connected electrically to the positive poles of battery cells 44a via further cell connector 48a. Further electrically conductive plastic element 56a is situated on a further electrical contact surface 58a of circuit board 18a. Further electrical contact surface 58a is positioned so as to be set apart from electrical contact elements 50a and to be opposite to electrical contact surface 54. Further electrically conductive plastic element 56a is pressed against further electrical contact surface 58a. Battery cell unit 26a includes at least two further cell holder units 60a. One of the further cell holder units 60a has a number of battery cells 44a, which is different from a number of battery cells 44a of cell holder unit 42a. Electronics unit 16a includes at least a plurality of additional electrically conductive plastic elements 62a and a plurality of other additional electrically conductive plastic elements (not shown explicitly). Additional electrically conductive plastic elements 62a and the other additional electrically conductive plastic elements are formed at least substantially identically to electrically conductive plastic element 20a. Further cell holder units 60a are connected electrically to circuit board 18a via additional electrically conductive plastic elements 62a and the other additional electrically conductive plastic elements. Further cell holder units 60a and cell holder unit 42a are positioned so as to be set apart from each other. At least electrically conductive plastic element 20a and further electrically conductive plastic element 56a are positioned so as to be set apart from additional electrically conductive plastic element 62a and the other additional electrically conductive plastic element.

Electrically conductive plastic element 20a has at least an electrical conductivity in a range of $10^{-13}$ S cm$^{-1}$ to $10^3$ S cm$^{-1}$. Electrically conductive plastic element 20a is designed to transmit electrical power, in particular, an electrical signal. Further electrically conductive plastic element 56a, additional electrically conductive plastic elements 62a, and the other additional electrically conductive plastic elements have an electrical conductivity, which corresponds at least substantially to the electrical conductivity of electrically conductive plastic element 20a.

Storage battery device 10a includes at least one housing unit 24a; electrically conductive plastic element 20a being situated on battery cell unit 26a and/or on housing unit 24a. Electrically conductive plastic element 20a is positioned at least substantially completely between housing unit 24a and battery cell unit 26a. Electrically conductive plastic element 20a surrounds battery cell unit 26a at least partially. Housing unit 24a has at least one lateral cover 64a. Lateral cover 64a is situated on battery cell unit 26a;

battery cell unit 26a being surrounded at least partially by lateral cover 64a. Electrically conductive plastic element 20a is positioned between lateral cover 64a and battery cell unit 26a; electrically conductive plastic element 20a being surrounded at least substantially completely by lateral cover 64a. Lateral cover 64a forms a shoulder 66a, which faces circuit board 18a. Shoulder 66a has a free end 68a, which is opposite to electrical contact surface 54a of circuit board 18a. Free end 68 of shoulder 66a of lateral cover 64a is situated so as to be set apart from electrical contact surface 54a. Electrically conductive plastic element 20a is positioned at least partially between lateral cover 64a, in particular, free end 68a, and circuit board 18a, in particular, electrical contact surface 54a of circuit board 18a. Electrically conductive plastic element 20a is forced against circuit board 18a and against cell connector 46a by lateral cover 64a. Electrically conductive plastic element 20a is guided partially through lateral cover 64a and battery cell unit 26a.

Further electrically conductive plastic element 56a is positioned at least substantially completely between housing unit 24a and battery cell unit 26a; further electrically conductive plastic element 56a surrounding battery cell unit 26a at least partially. Housing unit 24a has a further lateral cover 70a, which is situated on battery cell unit 26a, in particular, cell holder unit 42a. Battery cell unit 26a is surrounded at least partially by further lateral cover 70a. Further electrically conductive plastic element 56a is situated at least partially between further lateral cover 70a and battery cell unit 26a; further electrically conductive plastic element 56a being surrounded at least substantially completely by further lateral cover 70a. Further lateral cover 70a is formed at least substantially identically to lateral cover 64a. A free end 72a of a shoulder 74a of further lateral cover 70a is opposite to further electrical contact surface 58a of circuit board 18a; free end 72a of further lateral cover 70a being positioned so as to be set apart from further electrical contact surface 58a. Further electrically conductive plastic element 56a is positioned at least partially between further lateral cover 70a, in particular, free end 72a of shoulder 74a of further lateral cover 70a, and further electrical contact surface 58a of circuit board 18a; further electrically conductive plastic element 56a being forced against circuit board 18a and against further cell connector 48a by further lateral cover 70a. Further electrically conductive plastic element 62a is guided at least partially through further lateral cover 70a and battery cell unit 26a.

Storage battery device 10a includes at least one monitoring unit 28a, which is intended at least for monitoring battery cell unit 26a; monitoring unit 28a being formed at least partially by electrically conductive plastic element 20a. Monitoring unit 28a is at least configured to monitor the voltages of battery cells 44a; monitoring unit 28a including a regulating and/or control unit 76a. Regulating and/or control unit 76a is situated on circuit board 18a and is at least configured to measure the voltages of battery cells 44a, which are connected electrically to regulating and/or control unit 76a via electrically conductive plastic element 20a, further electrically conductive plastic element 56a, additional electrically conductive plastic elements 62a, and/or the other additional electrically conductive plastic elements, in particular, with the aid of circuit board 18a.

In addition, storage battery device 10a includes at least one electrical circuit protection unit 30a, which is configured to protect at least battery cell unit 26a and/or electronics unit 16a at least from damage due to a short circuit; electrical circuit protection unit 30a being formed at least partially by electrically conductive plastic element 20a. Electrical circuit protection unit 30a is formed by at least electrically conductive plastic element 20a, further electrically conductive plastic element 56a, additional electrically conductive plastic elements 62a, and/or the other additional electrically conductive plastic elements, which is/are configured to warm up at least in response to a short circuit.

Further exemplary embodiments of the present invention are shown in FIGS. 3 through 6. The following descriptions and the figures are limited mainly to the differences between the exemplary embodiments; with regard to identically designated components, in particular, with regard to components having the same reference characters, reference also being able to be made, in principle, to the figures and/or the description of the other exemplary embodiments, in particular, of FIGS. 1, 2a and 2b. In order to distinguish between the exemplary embodiments, the letter "a" follows the reference numerals of the exemplary embodiment in FIGS. 1, 2a and 2b. In the exemplary embodiments of FIGS. 3 through 6, the letter "a" is replaced by the letters "b" through "e."

Figure 3:
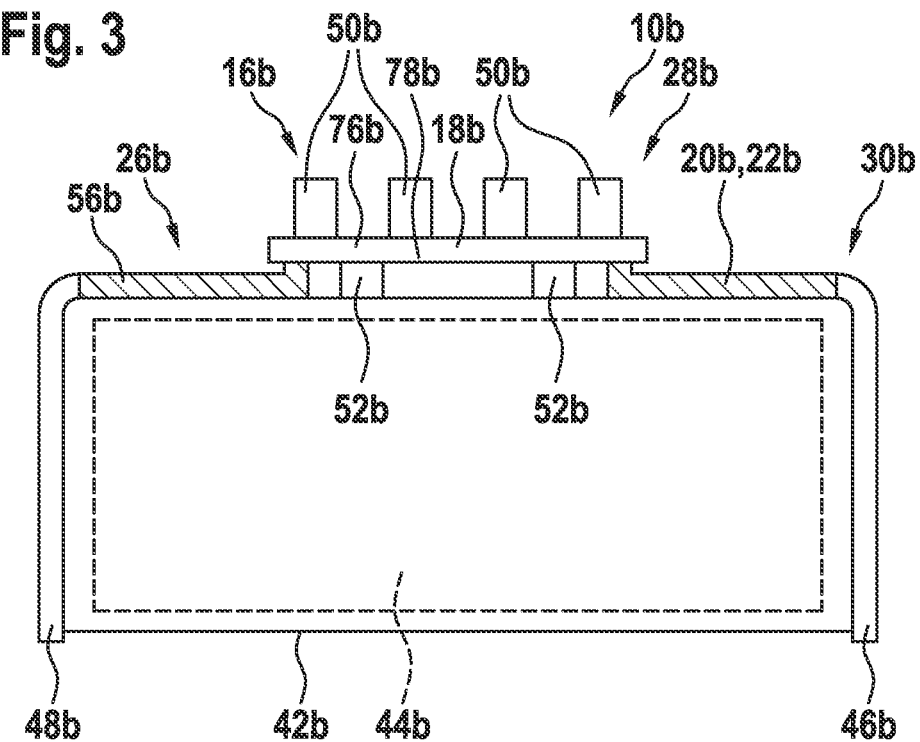
FIG. 3 shows a side view of a schematic representation of a second variant of the storage battery device according to an example embodiment of the present invention.

FIG. 3 shows a second variant of storage battery device 10b; an electrically conductive plastic element 20b being molded into a battery cell unit 26b of storage battery device 10b and/or into a housing unit of storage battery device 10b. At least electrically conductive plastic element 20b is extruded onto a cell holder unit 42b and/or onto a cell connector 46b. A circuit board 18b includes an additional electric contact surface 78b, which is situated opposite to battery cell unit 26b. Electrically conductive plastic element 20b is connected electrically to additional electrical contact surface 78b. A further electrically conductive plastic element 56b is extruded onto cell holder unit 42b and/or onto a further cell connector 48b. Further electrically conductive plastic element 56b is connected electrically to additional electrical contact surface 78b.

Figure 4:
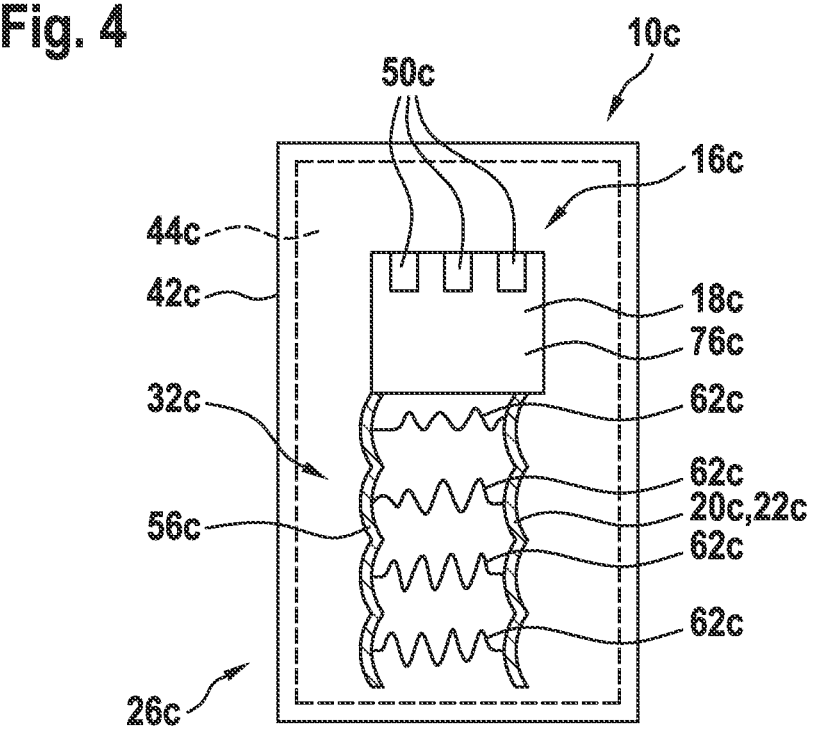
FIG. 4 shows a top view of a schematic representation of a third variant of the storage battery device according to an example embodiment of the present invention.

FIG. 4 shows a third variant of a storage battery device 10c, which includes at least one heating unit 32c that is configured to heat a battery cell unit 26c; heating unit 32c being formed at least partially by an electrically conductive plastic element 20c. Heating unit 32c is formed by electrically conductive plastic element 20c, a further electrically conductive plastic element 56c and additional electrically conductive plastic elements 62c. Electrically conductive plastic element 20c is connected electrically to further electrically conductive plastic element 56c via additional electrically conductive plastic elements 62c; a voltage being able to be applied between electrically conductive plastic element 20c and further electrically conductive plastic element 56c, the voltage being intended to generate a flow of current through at least electrically conductive plastic element 20c, further electrically conductive plastic element 56c, and additional electrically conductive plastic elements 62c. At least warming of the electrically conductive plastic element 20c, further electrically conductive plastic element 56c, and/or additional electrically conductive plastic elements 62c may be generated by the flow of current through electrically conductive plastic element 20c, further electrically conductive plastic element 56c, and additional electrically conductive plastic elements 62c, which means that warming of battery cell unit 26c may be induced, as well. A regulating and/or control unit 76c is configured to apply a voltage between electrically conductive plastic element 20c and further electrically conductive plastic element 56c. It is possible for regulating and/or control unit 76a to apply a voltage as a function of a temperature parameter, which is measurable, in particular, by a temperature sensor. Electrically conductive plastic element 20c and further electrically conductive plastic element 56c each have a cross-sectional diameter, which is greater than a cross-sectional diameter of additional electrically conductive plastic elements 62c.

Figure 5:
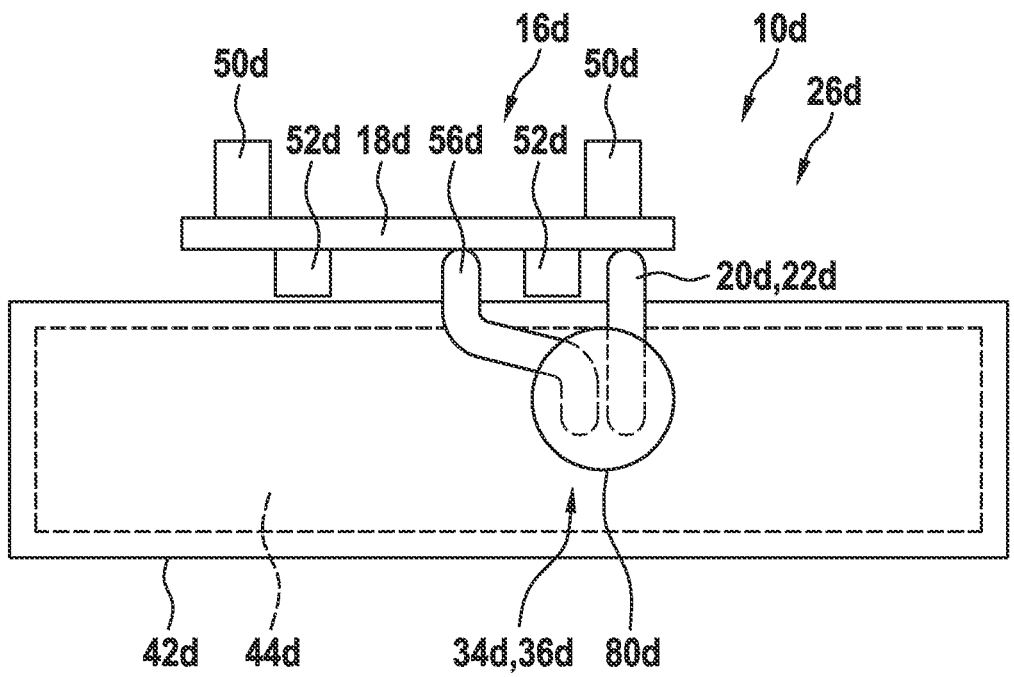
FIG. 5 shows a side view of a schematic representation of a fourth variant of the storage battery device according to an example embodiment of the present invention.

FIG. 5 shows a fourth variant of a storage battery device 10d, which includes at least an electronics unit 16d. Electronics unit 16d includes at least one operating element 34d, in particular, a pushbutton element 36d, which is formed at least partially by an electrically conductive plastic element 20d. Operating element 34d is formed by a pushbutton 80d, electrically conductive plastic element 20d, and a further electrically conductive plastic element 56d. At least electrically conductive plastic element 20d takes the form of an electrically conductive elastomer 22d. It is possible for further electrically conductive plastic element 56d to take the form of a further electrically conductive elastomer. Electrically conductive plastic element 20d and further electrically conductive plastic element 56d are positioned at least partially between pushbutton 80d and a battery cell unit 26d of storage battery device 10d, which are positioned so as to be set apart from each other in a rest state. Electrically conductive plastic element 20d and further electrically conductive plastic element 56d are designed to deform under a force applied to pushbutton 80d; the force pointing in a direction facing battery cell unit 26d. Electrically conductive plastic element 20d and further electrically conductive plastic element 56d are also configured to deform, in such a manner, due to the force applied to pushbutton 80d during manipulation of operating element 34d, that electrically conductive plastic element 20d contacts further electrically conductive plastic element 56d directly.

Figure 6:
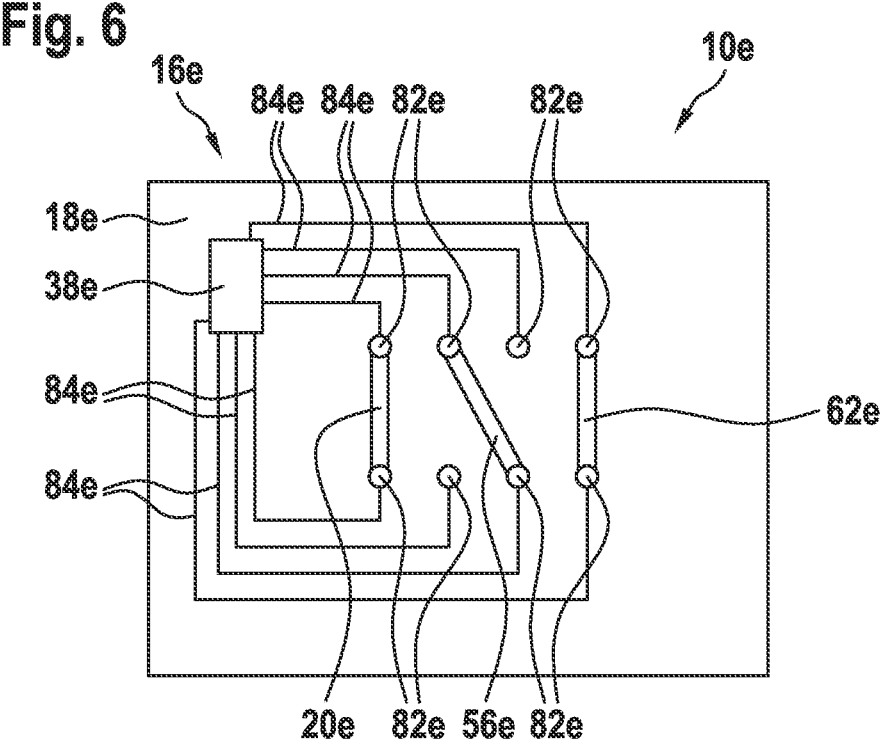
FIG. 6 shows a schematic representation of a bottom side of a circuit board of a fifth variant of the battery storage device according to an example embodiment of the present invention.

In a fifth variant, FIG. 6 shows a bottom side of a circuit board 18e of a storage battery device 10e, which includes at least one evaluation unit 38e; evaluation unit 38e being configured to evaluate a code of a battery cell unit (26e, not shown explicitly); the code being formed at least partially by an electrically conductive plastic element 20e. Evaluation unit 38e is situated on circuit board 18e; circuit board 18e having a plurality of contact points 82e. Contact points 82e are connected electrically to evaluation unit 38e via electrical conductors 84e. The electrical connection of certain contact points 82e with the aid of electrically conductive plastic element 20e is intended to generate a coding element of the code, which may be read out by evaluation unit 38e. Further coding elements of the code are formed by an electrical connection of particular contact points 82e with the aid of a further electrically conductive plastic element 56e and additional electrically conductive plastic elements 62e; the particular contact points being different from the contact points 82e that are connected electrically by electrically conductive plastic element 20e.

Figure 7:
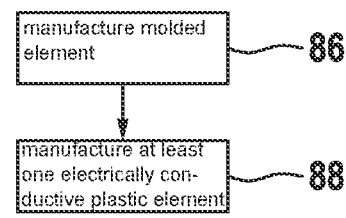
FIG. 7 shows a schematic flow chart of a method of the present invention for manufacturing a storage battery device according to an example embodiment of the present invention.

FIG. 7 schematically shows a method for manufacturing a storage battery device 10a-e for a battery pack 12a-e of a handheld power tool 14a-e. In at least one method step 86, a molded element of an electrically conductive plastic element 20a-e is manufactured in a single-component injection molding method. In at least one further method step 88, at least one electrically conductive plastic element 20a-e of an electronics unit 16a-e of storage battery device 10a-e is manufactured at least partially in a dispensing method or a 3-D printing method. In further method step 88, an electrically conductive material, in particular, e.g., an electrically conductive sealing compound, an electrically conductive adhesive agent, or the like, is dispensed onto the molded element or deposited onto the molded element in a 3-D printing method.

What is claimed is:

1. A storage battery device for a battery pack of a handheld power tool, comprising:
    at least one electronics unit that has at least one circuit board, the electronics unit including at least one electrically conductive plastic element, which is connected electrically to at least the circuit board, the electrically conductive plastic element being an electrically conductive elastomer;
    at least one housing unit; and
    at least one battery cell unit,
    wherein the circuit board includes at least one electrical contact surface at which the at least one electrically conductive plastic element is situated,
    wherein the electrically conductive plastic element is integrally molded into the battery cell unit and/or into the housing unit.

2. The storage battery device as recited in claim 1, wherein the electrically conductive plastic element has at least an electrical conductivity in a range of $10^{-10}$ S cm$^{-1}$ to $10^3$ S cm$^{-1}$.

3. The storage battery device as recited in claim 1, wherein the electrically conductive plastic element being situated on the battery cell unit and/or on the housing unit.

4. The storage battery device as recited in claim 1, further comprising:
    at least one monitoring unit configured to monitor the battery cell unit, the monitoring unit being formed at least partially of the electrically conductive plastic element.

5. The storage battery device as recited in claim 1, further comprising:
    at least one electrical circuit protection unit configured to protect at least the battery cell unit and/or the electronics unit at least from damage due to a short circuit, the electrical circuit protection unit being formed at least partially of the electrically conductive plastic element.

6. The storage battery device as recited in claim 1, further comprising:
    at least one heating unit configured at least to heat the battery cell unit, the heating unit being formed at least partially of the electrically conductive plastic element.

7. The storage battery device as recited in claim 1, wherein the electronics unit includes at least one operating element which is formed at least partially of the electrically conductive plastic element, the operating element being a pushbutton element.

8. The storage battery device as recited in claim 1, further comprising:
    at least one evaluation unit configured to evaluate a code of the battery cell unit, the code being formed at least partially of the electrically conductive plastic element.

9. A battery pack, comprising:
    at least one storage battery device, the storage device including at least one electronics unit that has at least one circuit board, the electronics unit including at least one electrically conductive plastic element, which is connected electrically to at least the circuit board, the electrically conductive plastic element being an electrically conductive elastomer;
    at least one housing unit; and
    at least one battery cell unit,
    wherein the circuit board includes at least one electrical contact surface at which the at least one electrically conductive plastic element is situated,
    wherein the electrically conductive plastic element is integrally molded into the battery cell unit and/or into the housing unit.

10. A handheld power tool comprising an exchangeable battery pack, the battery pack including at least one storage battery device, the storage device including at least one electronics unit that has at least one circuit board, at least one housing unit, and at least one battery cell unit, the electronics unit including at least one electrically conductive plastic element, which is connected electrically to at least the circuit board, the electrically conductive plastic element being an electrically conductive elastomer, wherein the circuit board includes at least one electrical contact surface at which the at least one electrically conductive plastic element is situated, wherein the electrically conductive plastic element is integrally molded into the battery cell unit and/or into the housing unit.

11. A method of manufacturing a storage battery device for a battery pack of a handheld power tool, the method comprising:

manufacturing at least one electrically conductive plastic element of an electronics unit of the storage battery device at least partially in a dispensing method or a 3-D printing method.

12. Battery pack for a handheld power tool, comprising:

at least one electronics unit that has at least one circuit board, the electronics unit including at least one electrically conductive plastic element, which is connected electrically to at least the circuit board, the electrically conductive plastic element being an electrically conductive elastomer;

at least one battery cell unit with a plurality of battery cells and at least one housing unit; and at least one monitoring unit configured to monitor the voltage of the battery cell unit, the monitoring unit being formed at least partially of the electrically conductive plastic element, wherein the monitoring unit comprises a regulating and/or control unit situated on the circuit board and configured to measure the voltages of the battery cells, which are connected electrically to the regulating and/or control unit via the electrically conductive plastic elements, wherein the electrically conductive plastic element is integrally molded into the battery cell unit and/or into the housing unit.

13. Battery pack according to claim 12, wherein the battery pack is an exchangeable battery pack.

* * * * *